(12) United States Patent
Moon

(10) Patent No.: US 11,548,504 B2
(45) Date of Patent: Jan. 10, 2023

(54) DRIVER ASSISTANCE SYSTEM AND CONTROL METHOD THEREOF

(71) Applicant: HL KLEMOVE CORP., Incheon (KR)

(72) Inventor: Joungchel Moon, Suwon-si (KR)

(73) Assignee: HL KLEMOVE CORP., Incheon (KR)

( * ) Notice: Subject to any disclaimer, the term of this patent is extended or adjusted under 35 U.S.C. 154(b) by 33 days.

(21) Appl. No.: 17/126,847

(22) Filed: Dec. 18, 2020

(65) Prior Publication Data

US 2021/0188267 A1    Jun. 24, 2021

(30) Foreign Application Priority Data

Dec. 20, 2019 (KR) ........................ 10-2019-0172375

(51) Int. Cl.
| | |
|---|---|
| *B60W 40/105* | (2012.01) |
| *B60W 30/14* | (2006.01) |
| *B60W 10/06* | (2006.01) |
| *B60W 10/10* | (2012.01) |

(52) U.S. Cl.
CPC .......... *B60W 30/143* (2013.01); *B60W 10/06* (2013.01); *B60W 10/10* (2013.01); *B60W 40/105* (2013.01); *B60W 2420/52* (2013.01); *B60W 2520/06* (2013.01); *B60W 2554/20* (2020.02); *B60W 2554/804* (2020.02)

(58) Field of Classification Search
CPC .... B60W 10/06; B60W 10/10; B60W 30/143; B60W 40/105; B60W 2554/20; B60W 2554/804; B60W 2420/52; B60W 2520/06
See application file for complete search history.

(56) References Cited

U.S. PATENT DOCUMENTS

| | | | |
|---|---|---|---|
| 8,855,848 B2 | 10/2014 | Zeng | |
| 10,585,188 B2 * | 3/2020 | Millar | .................. H01Q 1/3233 |
| 2006/0233461 A1 * | 10/2006 | Ma | ........................ G06V 10/235 |
| | | | 382/285 |
| 2021/0063560 A1 * | 3/2021 | Bosse | ..................... G01S 13/66 |

FOREIGN PATENT DOCUMENTS

| | | |
|---|---|---|
| JP | 3189711 B2 | 7/2001 |
| JP | 6530260 B2 | 6/2019 |
| KR | 10-2017-0055138 A | 5/2017 |

\* cited by examiner

*Primary Examiner* — Edwin A Young
(74) *Attorney, Agent, or Firm* — Hauptman Ham, LLP

(57) ABSTRACT

A driver assistance system according to an embodiment of the present disclosure includes: a radar provided in the vehicle to have an external sensing field for the vehicle and configured to acquire radar data; a memory configured to store a first graph stored in advance; and a processor configured to determine a static target based on the radar data and driving information comprising a driving velocity, generate a second graph based on the determined static target, and correct the driving velocity based on the first graph and the second graph.

20 Claims, 6 Drawing Sheets

DRIVER ASSISTANCE SYSTEM AND CONTROL METHOD THEREOF

CROSS-REFERENCE TO RELATED APPLICATION

This application is based on and claims priority under 35 U.S.C. § 119 to Korean Patent Application No. 2019-0172375, filed on Dec. 20, 2019 in the Korean Intellectual Property Office, the disclosure of which is incorporated herein by reference.

BACKGROUND

1. Technical Field

The present disclosure relates to a driver assistance system for determining the velocity of a vehicle being driven, and a control method thereof.

2. Description of the Related Art

A system that detects objects in front of the vehicle through radar and informs the driver that a pedestrian is located in front of the vehicle is also being developed.

However, in the case of a radar installed in front of the vehicle, the object is detected using a three-dimensional coordinate system (X, Y, Z), whereas two-dimensional information is acquired through an image acquired through a camera. Therefore, development of technology to improve the accuracy of tracking through the location and movement of objects including pedestrians is continuing through the fusion of radar and camera.

Meanwhile, the velocity of the vehicle is calculated by multiplying the wheel rotation velocity measured through the vehicle speed sensor by a constant value corresponding to the wheel radius. However, if tires wear out or the air pressure changes due to continuous driving, the vehicle velocity measured by the vehicle speed sensor may be different from the actual vehicle velocity. This difference in vehicle velocity may cause problems in engine control and transmission control using vehicle velocity.

SUMMARY

Therefore, it is an aspect of the disclosure to provide a driver assistance system that accurately calculates the velocity of a vehicle while driving by using a static target sensed through a radar, and further secures stability of engine or transmission control, and a control method thereof.

Therefore, it is an aspect of the present disclosure to provide a driver assistance system including: a radar provided in the vehicle to have an external sensing field for the vehicle and configured to acquire radar data; a memory configured to store a first graph stored in advance; and a processor configured to determine a static target based on the radar data and driving information comprising a driving velocity, generate a second graph based on the determined static target, and correct the driving velocity based on the first graph and the second graph.

The processor may be configured to determine whether the vehicle is driving straight based on the driving information.

The processor may be configured to determine the static target based on the difference in velocity between the driving velocity and the radar data when the vehicle is driving straight.

The processor may be configured to generate the second graph based on the velocity and angle of the static target.

The processor may be configured to generate a plurality of the second graph based on a plurality of static targets comprised in the radar data, and compare the number of the generated plurality of static targets with a preset reference value.

The processor may be configured to calculate a difference value between the first graph and the second graph based on the comparison result, and correct the driving velocity based on the difference value.

The processor may be configured to transmit the corrected driving velocity to the engine management system and transmission control unit.

It is another aspect of the present disclosure to provide a control method of a driver assistance system, the method includes: storing a first graph stored in advance; acquiring radar data from a radar provided in the vehicle to have an external sensing field for the vehicle; determining a static target based on the radar data and driving information comprising a driving velocity; generating a second graph based on the determined static target; and correcting the driving velocity based on the first graph and the second graph.

The determining the static target may include: determining whether the vehicle is driving straight based on the driving information.

The determining the static target may include: determining the static target based on the difference in velocity between the driving velocity and the radar data when the vehicle is driving straight.

The generating the second graph may include: generating the second graph based on the velocity and angle corresponding to the static target.

The correcting the driving velocity may include: generating a plurality of the second graph based on a plurality of static targets comprised in the radar data; and comparing the number of the generated plurality of static targets with a preset reference value.

The correcting the driving velocity may include: calculating a difference value between the first graph and the second graph based on the comparison result; and correcting the driving velocity based on the difference value.

The control method may further include: transmitting the corrected driving velocity to the engine management system and transmission control unit.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
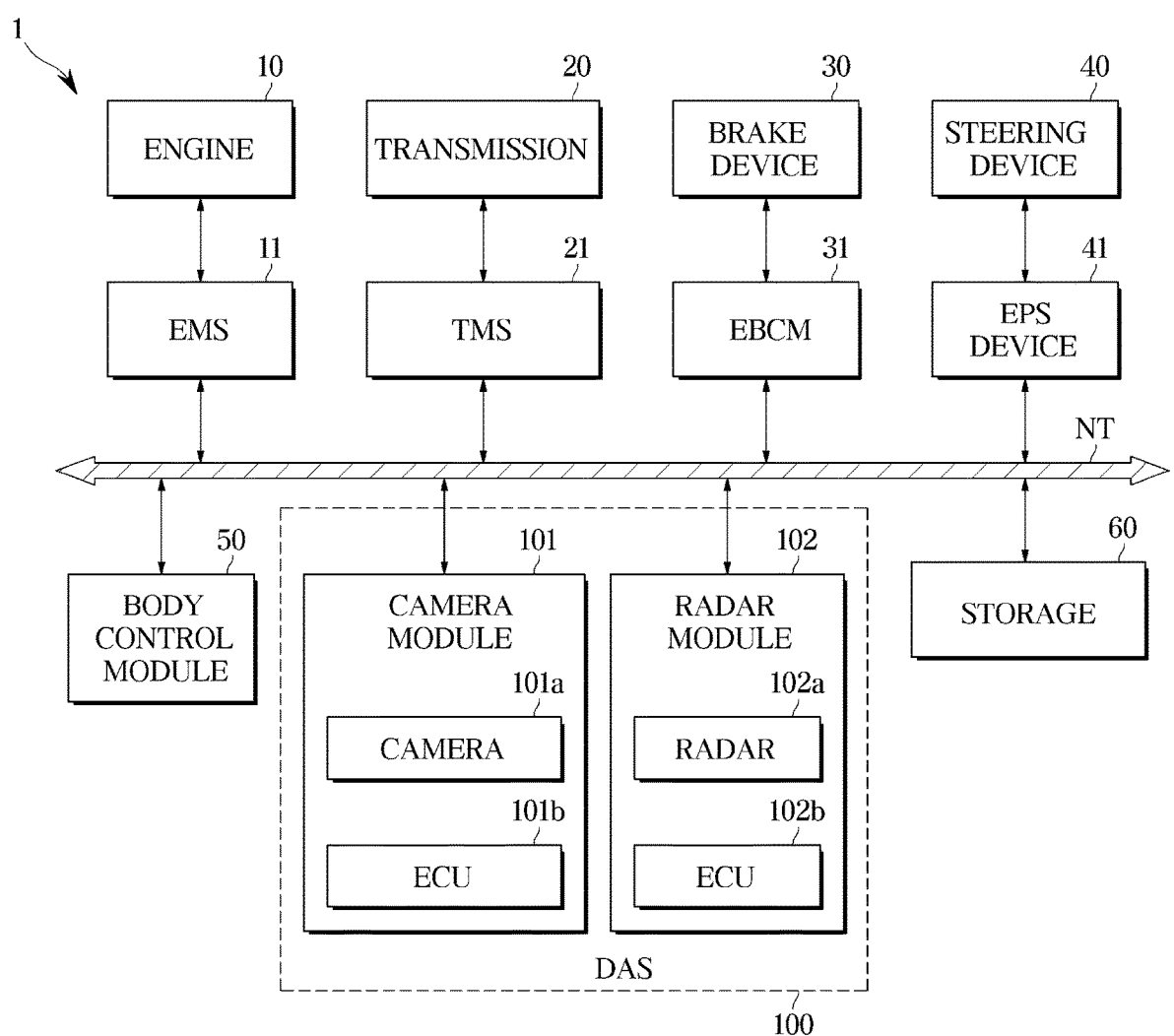
FIG. 1 is a block diagram illustrating a configuration of a vehicle according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that one member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a block diagram illustrating a configuration of a vehicle according to an embodiment.

Referring to FIG. 1, a vehicle 1 includes an engine 10, a transmission 20, a braking device 30, and a steering device 40. The engine 10 may include a cylinder and a piston, and generate power required for the vehicle 1 to travel. The transmission 20 may include a plurality of gears, and transmit the power generated by the engine 10 to wheels. The braking device 30 may decelerate or stop the vehicle 1 through friction with the wheels. The steering device 40 may change the heading direction of the vehicle 1.

The vehicle 1 may include a plurality of machine parts. For example, the vehicle 1 may include an engine management system (EMS) 11, a transmission control unit (TCU) 21, an electronic brake control module (EBCM) 31, an electronic power steering (EPS) 41, a body control module (BCM) 50, and a driver assistance system (DAS) 100.

The EMS 11 may control the engine 10 in response to an acceleration intention of the driver through an accelerator pedal or a request of the DAS 100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio of the engine 10 to the wheels.

The EBCM 31 may control the braking device 30 in response to a braking intention of the driver through a braking pedal and/or a slip of the wheels. For example, the EBCM 31 may temporarily release the braking of the wheels in response to a slip of the wheels sensed at a time of braking the vehicle 1 (anti-lock braking systems: ABS). The EBCM 31 may selectively release braking of the wheels in response to over-steering and/or under-steering sensed at a time of steering the vehicle 1 (electronic stability control: ESC). In addition, the EBCM 31 may temporarily brake the wheels in response to a slip of the wheels sensed at a time of driving the vehicle 1 (traction control system: TCS).

The EPS 41 may assist the operation of the steering device 40 in response to a steering intention of the driver through the steering wheel such that the driver may easily operate the steering wheel. For example, the EPS 41 may assist the operation of the steering device 40 such that the steering force is reduced during low-velocity travelling or parking and the steering force is increased during high-velocity travelling.

The BCM 50 may control the operation of machine parts that provide convenience to the driver or ensure the safety of the driver. For example, the BCM 50 may control a head lamp, a wiper, a cluster, a multifunction switch, a direction indicator lamp, and the like.

The storage 60 may store various data that the vehicle 1 receives from the outside. For example, the storage 60 stores an High Definition (HD) Map through an Audio Video Navigation (AVN) device or a communication network provided in the vehicle 1. Here, the HD map is a 3D map for autonomous driving, and includes both static data on fixed objects such as lanes, landmarks, traffic signs, median strip, and curbs, as well as variable target dynamic data such as surrounding vehicles, road conditions and traffic signals.

Typically, HD maps can be delivered from a map provider called Mobile Mapping System (MMS) because of the capacity and variability of dynamic data. The disclosed storage 60 stores the HD map delivered by the map provider and then delivers the HD map to the DAS 100 upon request. The DAS 100 can use the data on the driving environment acquired from the camera module 101 and the radar module 102 to be described later to update the received HD map. In addition, the DAS 100 may modify Global Positioning System (GPS) data to be displayed on the HD map according to the disclosed embodiment.

The DAS 100 may assist the driver in manipulating (driving, braking, and steering) the vehicle 1. For example, the DAS 100 may sense a surrounding environment of the vehicle 1 (e.g., another vehicle, a pedestrian, a cyclist, a lane, a road sign, and the like), and control driving and/or braking and/or steering of the vehicle 1 in response to the sensed environment.

The DAS 100 may provide the driver with various functions. For example, the DAS 100 may include a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The DAS 100 includes a camera module 101 that acquires image data of the surrounding of the vehicle 1 and a radar module 102 that acquires object data of the surrounding of the vehicle 1.

The camera module 101 may include a camera 101a and an electronic control unit (ECU) 101b, and photograph at least one of the front or the lateral side of the vehicle 1 and recognize another vehicle, a pedestrian, a cyclist, a lane, a road sign, and the like.

The radar module 102 may include a radar 102a and an ECU 102b, and acquire a relative position, a relative velocity, and the like of an object of the surrounding of the vehicle 1 (e.g., another vehicle, a pedestrian, a cyclists, and the like).

The above described electronic components may communicate with each other through vehicle communication network NT. For example, the machine parts may transmit data through Ethernet, media oriented systems transport (MOST), Flexray, controller area network (CAN), local interconnect network (LIN), and the like. For example, the DAS 100 may transmit a driving control signal, a braking signal, and a steering signal to the EMS 11, the EBCM 31, and the EPS 41, respectively.

Figure 2:
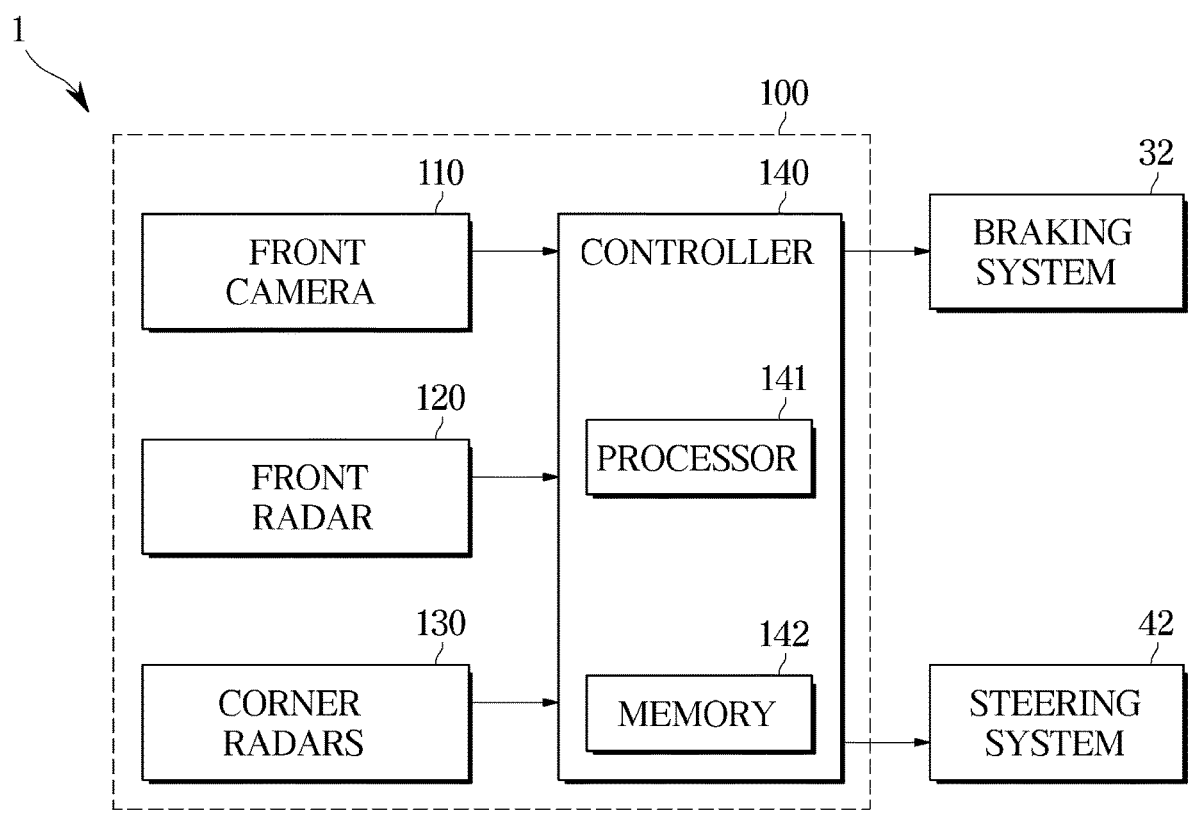
FIG. 2 is a block diagram illustrating a configuration of a driver assistance system according to an embodiment.
Figure 3:
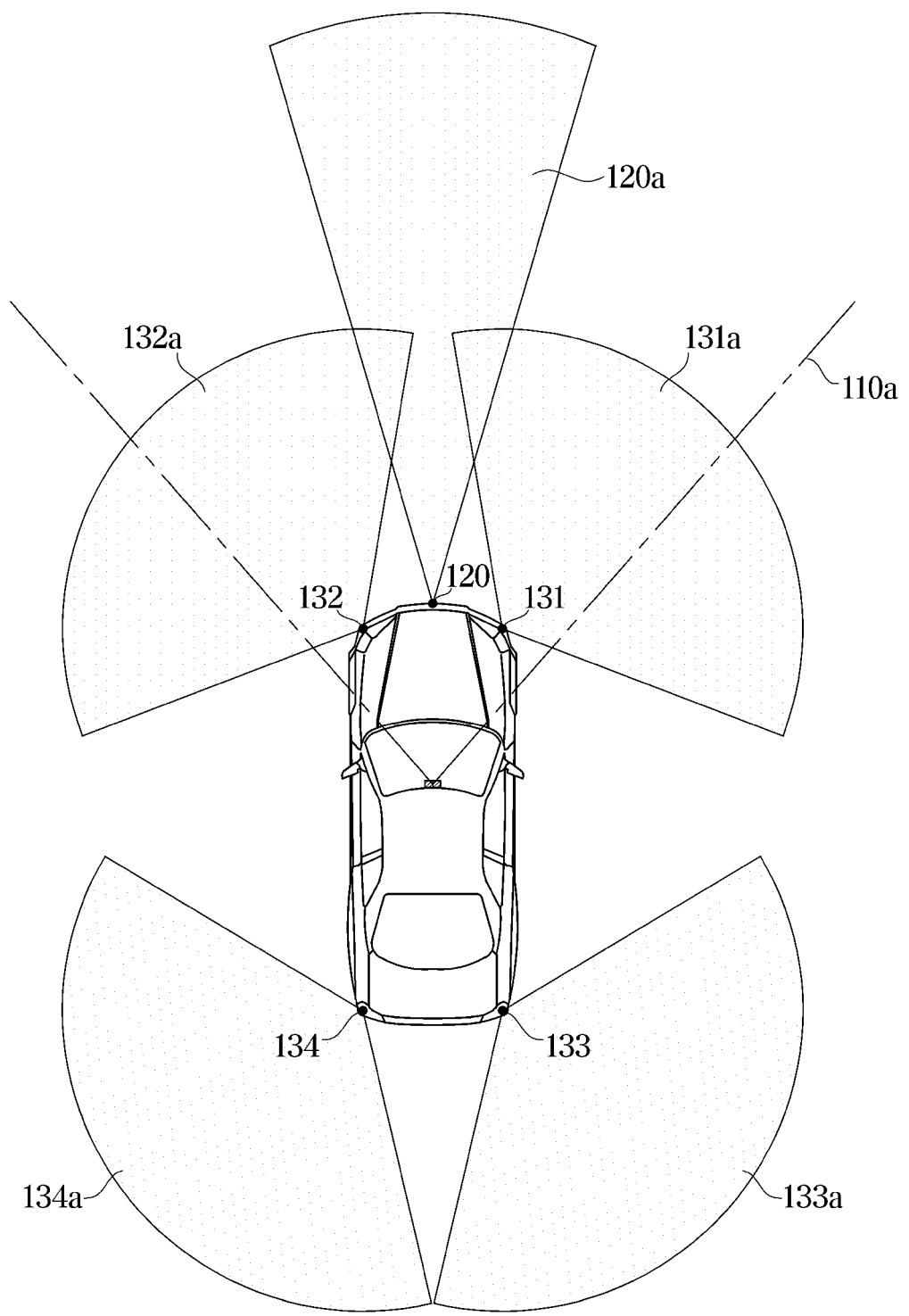
FIG. 3 is a view illustrating a camera and a radar included in a driver assistance system according to an embodiment.

FIG. 2 is a block diagram illustrating a configuration of a DAS according to an embodiment. FIG. 3 is a view illustrating a camera and a radar included in a DAS according to an embodiment.

Referring to FIG. 2, the vehicle 1 may include a braking system 32, a steering system 42, and a DAS 100.

The braking system 32 includes the EBCM (31 in FIG. 1) and the braking device (30 in FIG. 1), which have been described with reference to FIG. 1, the steering system 42 includes the EPS (41 in FIG. 1) and the steering device (40 in FIG. 1).

The DAS 100 may include a front camera 110, a front radar 120, and a plurality of corner radars 130.

The front camera 110 may have a field of view 110*a* facing the front of the vehicle 1 as shown in FIG. 3. The front camera 110 may be installed, for example, on the front windshield of the vehicle 1.

The front camera 110 may photograph the front of the vehicle 1 and acquire image data of the front of the vehicle 1. The image data of the front of the vehicle 1 may include position information of another vehicle, a pedestrian, a cyclist, or a lane existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 140. For example, the front camera 110 may be connected to the controller 140 through a vehicle communication network NT, may be connected to the controller 140 through a hard wire, or may be connected to the controller 140 through a printed circuit board (PCB).

The front camera 110 may transmit image data in front of the vehicle 1 to the controller 140.

The front radar 120 may have a field of sensing 120*a* facing the front of the vehicle 1 as shown in FIG. 3. The front radar 120 may be installed, for example, on a grille or a bumper of the vehicle 1.

The front radar 120 may include a transmission antenna (or a transmission antenna array) that radiates transmission radio waves forward of the vehicle 1 and a reception antenna (or a reception antenna array) that receives reflected radio waves reflected from an object. The front radar 120 may acquire front radar data from the transmission radio waves transmitted by the transmission antenna and the reflected radio waves received by the reception antenna. Front radar data may include distance information and velocity information regarding another vehicle, a pedestrian, or a cyclist existing in front of the vehicle 1. The front radar 120 may calculate the relative distance to the object on the basis of the phase difference (or time difference) between the transmission radio waves and the reflected radio waves, and calculate the relative velocity of the object on the basis of the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131*a* directed toward the front right side of the vehicle 1 as shown in FIG. 3. The first corner radar 131 may be installed on the right side of the front bumper of the vehicle 1, for example. The second corner radar 132 may have a field of sensing 132*a* directed toward the front left side of the vehicle 1, and may be installed on the left side of the front bumper of the vehicle 1, for example. The third corner radar 133 may have a field of sensing 133*a* directed toward the rear right side of the vehicle 1 and may be installed on the right side of the rear bumper of the vehicle 1, for example. The fourth corner radar 134 may have a field of sensing 134*a* directed toward the rear left side of the vehicle 1 and may be installed on the left side of the rear bumper of the vehicle 1, for example.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and velocity information regarding another vehicle, a pedestrian, or a cyclist (hereinafter referred to as "an object") positioned on the front right side of the vehicle 1. The second corner radar data may include distance information and velocity information regarding an object positioned on the front left side of the vehicle 1. The third and fourth corner radar data may respectively include distance and velocity information regarding an object located on the rear right side of the vehicle 1 and distance and velocity information regarding an object located on the rear left side of the vehicle 1.

Each of the first, second, third, and fourth corner radars 131, 132, 133 and 134 may be connected to the controller 140 through a vehicle communication network NT, a hard wire, or a printed circuit board, for example. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU (101*b* in FIG. 1) of the camera module (101 in FIG. 1) and/or the ECU (102*b* in FIG. 1) of the radar module (102 in FIG. 1), and/or an integrated ECU.

The controller 140 includes a processor 141 and a memory 142.

The processor 141 may process the front image data of the front camera 110, the front radar data of the front radar 120 and the corner radar data of the plurality of corner radars 130, and generate a braking signal and a steering signal for controlling the braking system 32 and the steering system 42. For example, the processor 141 may include an image signal processor for processing front image data of the front camera 110 and/or a digital signal processor for processing radar data of the radars 120, 130 and/or a micro control unit (MCU) for generating a braking signal and a steering signal.

The processor 141 may sense objects (e.g., another vehicle, a pedestrian, a cyclist, and the like) front of the vehicle 1 on the basis of the front image data of the front camera 110 and the front radar data of the front radar 120.

In detail, the processor 141 may acquire position (distance and direction) and relative velocity of the objects in front of the vehicle 1 on the basis of the front radar data of the front radar 120. The processor 141 may acquire position (direction) and type information (for example, whether the object is another vehicle, a pedestrian, or a cyclist) of the object in front of the vehicle 1 on the basis of the front image data of the front camera 110. In addition, the processor 141 allows the object sensed by the front image data to match the object sensed by the front radar data, and acquires the type information, the position, and the relative velocity of the front objects of the vehicle 1 on the basis of a result of the matching.

The processor 141 may generate a braking signal and a steering signal on the basis of the type information, the position, and the relative velocity of the front objects.

For example, the processor 141 searches for the current location of the vehicle 1 on the HD map, calculates a time to collision (TTC) between the vehicle 1 and the front object on the basis of the position (distance) and the relative velocity of the front object, and warns the driver of a collision or transmits a braking signal to the braking system 32 on the basis of a result of comparing the TTC with a predetermined reference time. In response to the TTC less than a predetermined first reference time, the processor 141 may allow an alert to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) on the basis of the velocity information (relative velocity) of front objects, and warn the driver of a collision or transmit a braking signal to the braking system 32 on the basis of a result of comparing the DTC with distances to the front objects.

The processor 141 may acquire position (distance and direction) and relative velocity of the objects on the sides of the vehicle 1 (front right, front left, rear right, and rear left) on the basis of corner radar data of the plurality of corner radars 130.

The memory 142 stores programs and/or data for processing image data by the processor 141, programs and/or data for processing radar data by the processor 141, and programs and/or data for generating a braking signal and/or a steering signal by the processor 141.

The memory 142 may temporarily store the image data received from the front camera 110 and/or the radar data received from the radars 120 and 130, and may temporarily store a result of processing the image data and/or the radar data of the processor 141.

In addition, the memory 142 temporarily stores the HD map received from the storage 60, and the provides stored HD map, image data and radar data when the processor 141 locates the position of the vehicle 1 to be described later.

The memory 142 may include a volatile memory, such as an S-RAM, a D-RAM, and the like, and a non-volatile memory, such as a flash memory, a read only memory (ROM), an erasable programmable read only memory (EPROM), and the like.

Figure 4:
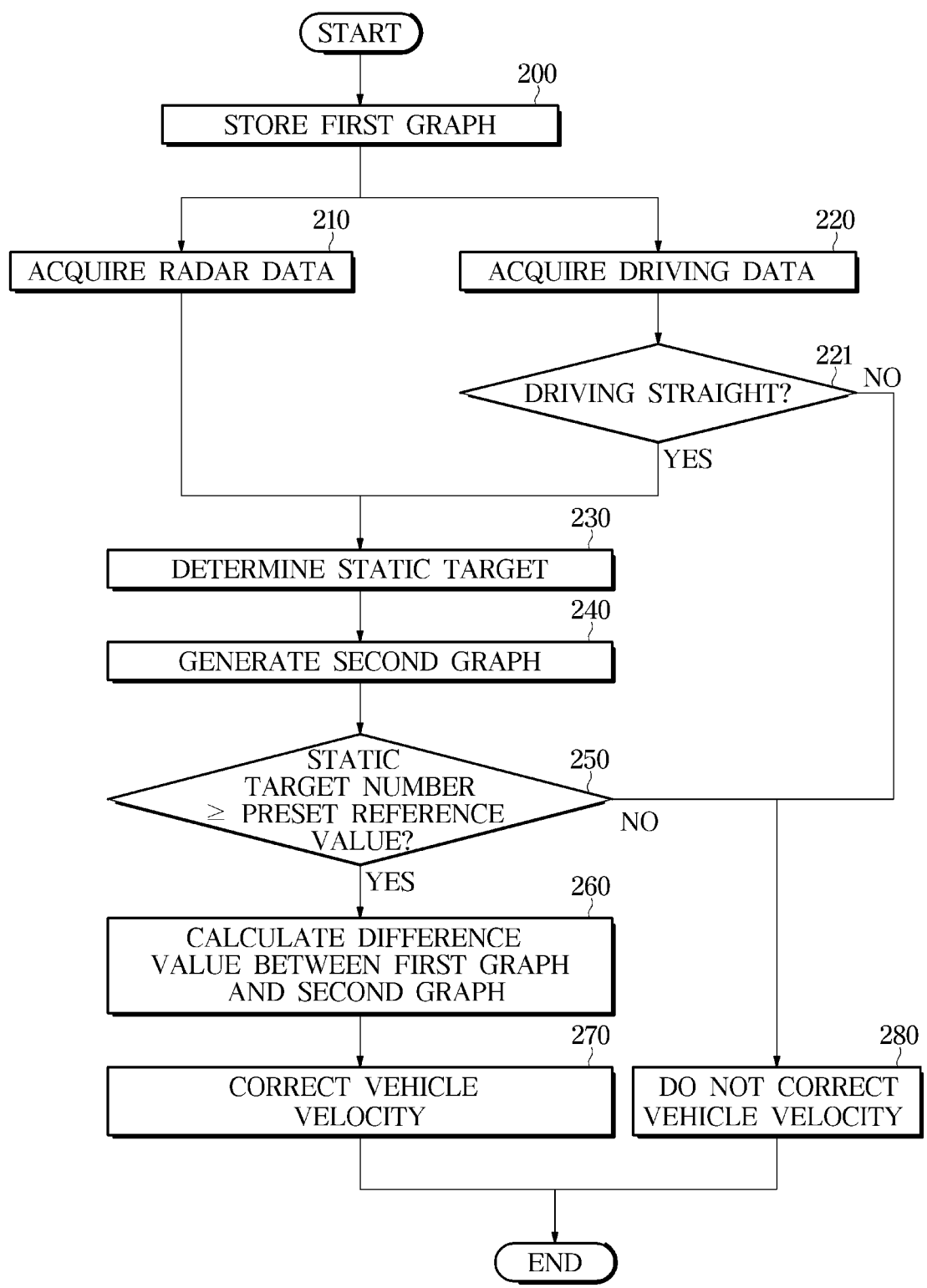
FIG. 4 is a flowchart illustrating a control method of a driver assistance system according to an embodiment.

FIG. 4 is a flowchart illustrating a control method of a driver assistance system according to an embodiment.

Referring to FIG. 4, the DAS 100 stores a first graph (200).

Here, the first graph may be a cosine graph. The first graph is stored in the memory 142 and is used for comparison with the second graph to be described later.

The DAS 100 acquires radar data (210).

Radar data includes information on the front object. The front object can be converted to coordinates, and the relative velocity of the object and the angle between the object and the vehicle 1 are included. Radar data can include both dynamically moving objects as well as stationary objects.

The DAS 100 acquires driving information (220).

The driving information may be collected from sensors or various control units provided in the vehicle 1 by the DAS 100. Specifically, the driving information may include various information such as a driving velocity of the vehicle 1 and angular velocity (Yaw rate).

The DAS 100 determines whether the vehicle 1 is driving straight on the basis of the acquired driving information (221). If the vehicle 1 is not driving straight (No in 221), the DAS 100 does not perform the velocity correction to be executed in the present disclosure (280).

If the vehicle 1 is driving straight (YES in 221), the DAS 100 corrects the velocity of the vehicle 1 through the following method.

The DAS 100 recognizes a static target based on the acquired radar data and driving information (230).

Specifically, the DAS 100 selects a static target that does not move among several targets included in radar data. As an example, the DAS 100 may determine a static target by extracting a velocity difference between the vehicle 1 and a static target and comparing the extracted velocity difference.

The DAS 100 generates a second graph for the determined static target (240).

The X-axis of the second graph can be expressed as the angle of the static target. The Y-axis of the second graph can be expressed as the ratio of the static target velocity and the vehicle velocity. A method of forming the second graph by the DAS 100 will be described with reference to FIGS. 5 to 6.

The DAS 100 compares the number of static targets and a preset reference value (250).

Specifically, the DAS 100 examines the effectiveness of the second graph based on the above-described reference value. Specifically, radar data may include various static targets. Since the generated second graph targets the stationary target, the generated second graph will be generated in almost the same form. If the second graph is generated through one static target and the velocity of the vehicle 1 is calculated through the difference, incorrect correction may be performed. The DAS 100 may generate a second graph when the number of static targets is greater than or equal to a preset reference value, and determine that the second graph is valid only when there is a static target greater than or equal to the preset reference value.

Meanwhile, the preset reference value may be a variety of numbers, and may be changed according to a manufacturer's or a user's input.

If the number of static targets is less than the preset reference value (No in 260), the DAS 100 does not correct the velocity of vehicle 1. If the number of static targets is more than the preset reference value (YES in 260), the DAS 100 corrects the velocity of vehicle 1.

Specifically, the DAS 100 calculates the difference value between the first graph and the second graph.

The difference value may be an arithmetic mean of the ratio of the second graph and the first graph. A detailed description of the difference value will be described later with reference to FIGS. 5 and 6.

the DAS 100 corrects the velocity of vehicle 1 by applying the calculated difference value. Through this, the DAS 100 can accurately calculate the velocity of the vehicle while driving, and further secure the stability of the engine or transmission control.

Figure 5:
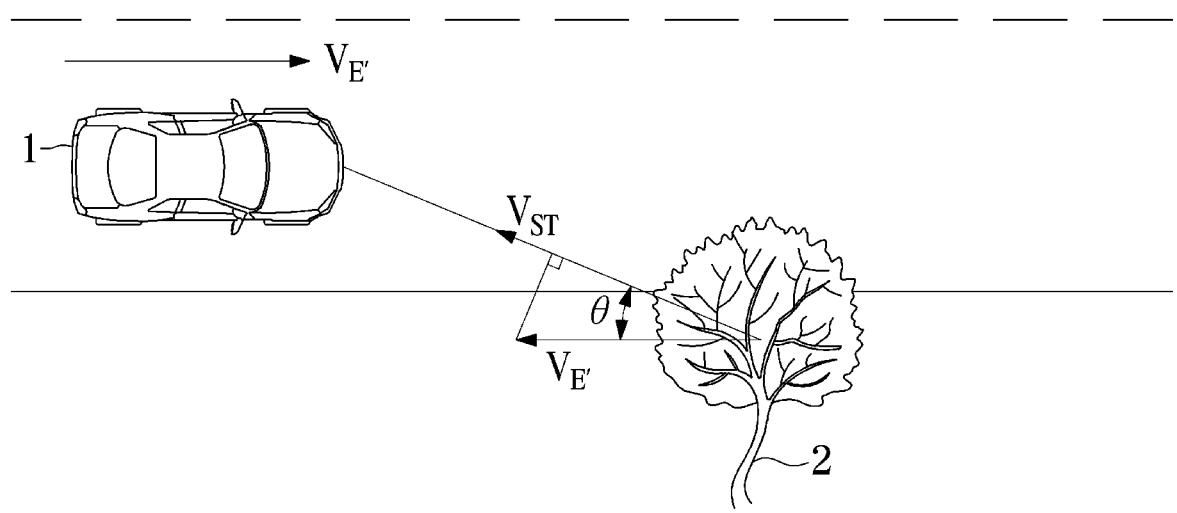
FIG. 5 is a view for illustrating a method of generating a second graph.
Figure 6:
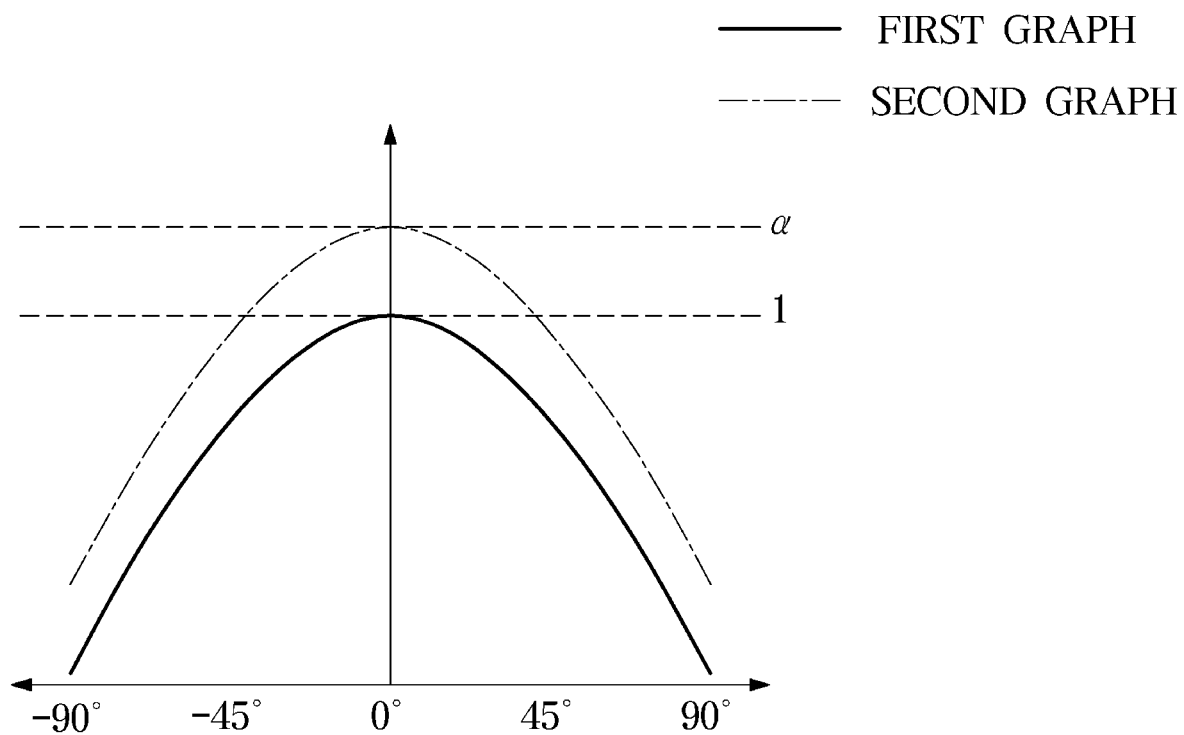
FIG. 6 is a view for illustrating a method of comparing a first graph and a second graph.

FIG. 5 is a view for illustrating a method of generating a second graph. FIG. 6 is a view for illustrating a method of comparing a first graph and a second graph.

Referring to FIG. 5, the DAS 100 may determine that the vehicle 1 is currently driving straight. The DAS 100 may determine that the tree 2 is a static target by the difference in velocity between the tree 2 and the vehicle 1 among radar data.

The DAS 100 may collect a driving velocity ($V_E$) from a sensor of the vehicle 1. That is, $V_E$ is collected by driving information and is the driving velocity of the vehicle recognized by the sensor.

The DAS 100 can acquire the relative velocity ($V_{ST}$) of the vehicle 1 and the tree 2 and the angle (θ) of the vehicle 1 and the tree 2 through radar data. Here, the relative velocity ($V_{ST}$) between vehicle 1 and tree 2 is the velocity of the static target.

The collected driving velocity ($V_E$), the velocity of the static target ($V_{ST}$), and the angle (θ) may be summarized in Equation 1.

$$V_{ST} = \alpha * V_E * \cos(\theta) \quad \text{<Equation 1>}$$

Meanwhile, α is a difference value representing the difference between the driving velocity recognized by the sensor and the actual driving velocity of the vehicle 1. If the driving velocity ($V_E$) recognized by the sensor matches the actual vehicle velocity, α is 1. However, if the difference value is not 1, it is necessary to correct the driving velocity recognized by the sensor.

The DAS 100 generates a second graph, that is, α*cos(θ) through Equation 2 modified from Equation 1.

$$\alpha * \cos(\theta) = V_{ST}/V_E \quad \text{<Equation 2>}$$

Referring to FIG. 6, in the second graph, the X-axis is an angle (θ), and the Y-axis may be drawn as a ratio of the velocity ($V_{ST}$) of the static target and the driving velocity ($V_E$) recognized by the sensor. As an example, the DAS 100 may generate a second graph from the tree 2, which has a higher value at 0° than the first graph through Equation 2. The DAS 100 may calculate a difference value α through an arithmetic mean comparing the first graph and the second graph.

The DAS 100 may calculate a velocity at which the vehicle 1 actually travels based on the difference value α. The DAS 100 may transmit the corrected driving velocity to the engine management system 10 and the transmission control unit 21 to ensure stability of the engine or transmission control.

The driver assistance system and control method thereof according to the disclosed aspect can accurately calculates the velocity of a vehicle while driving by using a static target sensed through a radar, and further secures stability of engine or transmission control.

What is claimed is:

1. A driver assistance system comprising:
   a radar sensor provided in a vehicle to have an external sensing field for the vehicle and configured to acquire radar data;
   a memory configured to store a first graph; and
   a processor communicatively connected to the radar sensor acquiring radar data and configured to:
   recognize a static target based on the radar data and driving information comprising a driving velocity,
   generate a second graph based on the recognized static target, and
   correct the driving velocity based on the first graph and the second graph.

2. The driver assistance system of claim 1, wherein the processor is configured to determine whether the vehicle is driving straight based on the driving information.

3. The driver assistance system of claim 2, wherein the processor is configured to:
   recognize at least one target based on the radar data,
   determine a relative velocity of the at least one target with respect to the vehicle, and
   recognize the static target among the at least one target based on the relative velocity of the at least one target with respect to the vehicle and the driving velocity when the vehicle is driving straight.

4. The driver assistance system of claim 1, wherein the processor is configured to generate the second graph based on a velocity and an angle of the static target.

5. The driver assistance system of claim 1, wherein the processor is configured to:
   recognize a plurality of static targets based on the radar data,
   generate a plurality of the second graph based on the plurality of the static targets, and
   compare the number of the plurality of static targets with a preset reference value.

6. The driver assistance system of claim 5, wherein the processor is configured to calculate a difference value between the first graph and the second graph based on the comparison result, and correct the driving velocity based on the difference value.

7. The driver assistance system of claim 1, wherein the processor is configured to transmit the corrected driving velocity to an engine management system and a transmission control unit.

8. A control method of a driver assistance system, the method comprising:
   acquiring radar data from a radar sensor provided in a vehicle to have an external sensing field for the vehicle;
   recognizing a static target based on the radar data and driving information comprising a driving velocity;
   generating a second graph based on the recognized static target; and
   correcting the driving velocity based on a pre-stored first graph and the second graph.

9. The control method of claim 8, wherein the recognizing of the static target comprises:
   determining whether the vehicle is driving straight based on the driving information.

10. The control method of claim 9, wherein the recognizing of the static target comprises:
    recognizing at least one target based on the radar data;
    determining a relative velocity of the at least one target with respect to the vehicle; and
    recognizing the static target among the at least one target based on the relative velocity of the at least one target with respect to the vehicle and the driving velocity when the vehicle is driving straight.

11. The control method of claim 8, wherein the generating the second graph comprises:

generating the second graph based on a velocity and an angle corresponding to the static target.

12. The control method of claim 8, wherein the correcting the driving velocity comprises:
recognizing a plurality of static targets based on the radar data;
generating a plurality of the second graph based on the plurality of the static targets; and
comparing the number of the plurality of static targets with a preset reference value.

13. The control method of claim 12, wherein the correcting the driving velocity comprises:
calculating a difference value between the first graph and the second graph based on the comparison result; and
correcting the driving velocity based on the difference value.

14. The control method of claim 8, further comprising:
transmitting the corrected driving velocity to an engine management system and a transmission control unit.

15. A non-transitory computer-readable medium storing computer-executable instructions, which when executed by a processor, cause the processor to:
receive radar data;
recognize a static target based on the radar data and driving information of a host vehicle comprising a driving velocity of the host vehicle;
generate a second graph based on the recognized static target; and
correct the driving velocity based on a pre-stored first graph and the second graph.

16. The non-transitory computer-readable medium of claim 15, further storing instructions, which when executed by the processor, cause the processor to:
determine whether the host vehicle is driving straight based on the driving information.

17. The non-transitory computer-readable medium of claim 16, further storing instructions, which when executed by the processor, cause the processor to:
recognize at least one target based on the radar data;
determine a relative velocity of the at least one target with respect to the vehicle; and
recognize the static target among the at least one target based on the relative velocity of the at least one target with respect to the host vehicle and the driving velocity when the host vehicle is driving straight.

18. The non-transitory computer-readable medium of claim 15, further storing instructions, which when executed by the processor, cause the processor to:
generate the second graph based on a velocity and an angle of the static target.

19. The non-transitory computer-readable medium of claim 15, further storing instructions, which when executed by the processor, cause the processor to:
recognize a plurality of static targets based on the radar data;
generate a plurality of the second graph based on the plurality of the static targets; and
compare the number of the plurality of static targets with a preset reference value.

20. The non-transitory computer-readable medium of claim 19, further storing instructions, which when executed by the processor, cause the processor to:
calculate a difference value between the pre-stored first graph and the second graph based on the comparison result; and
correct the driving velocity based on the difference value.

* * * * *